United States Patent Office 3,105,981
Patented Oct. 8, 1963

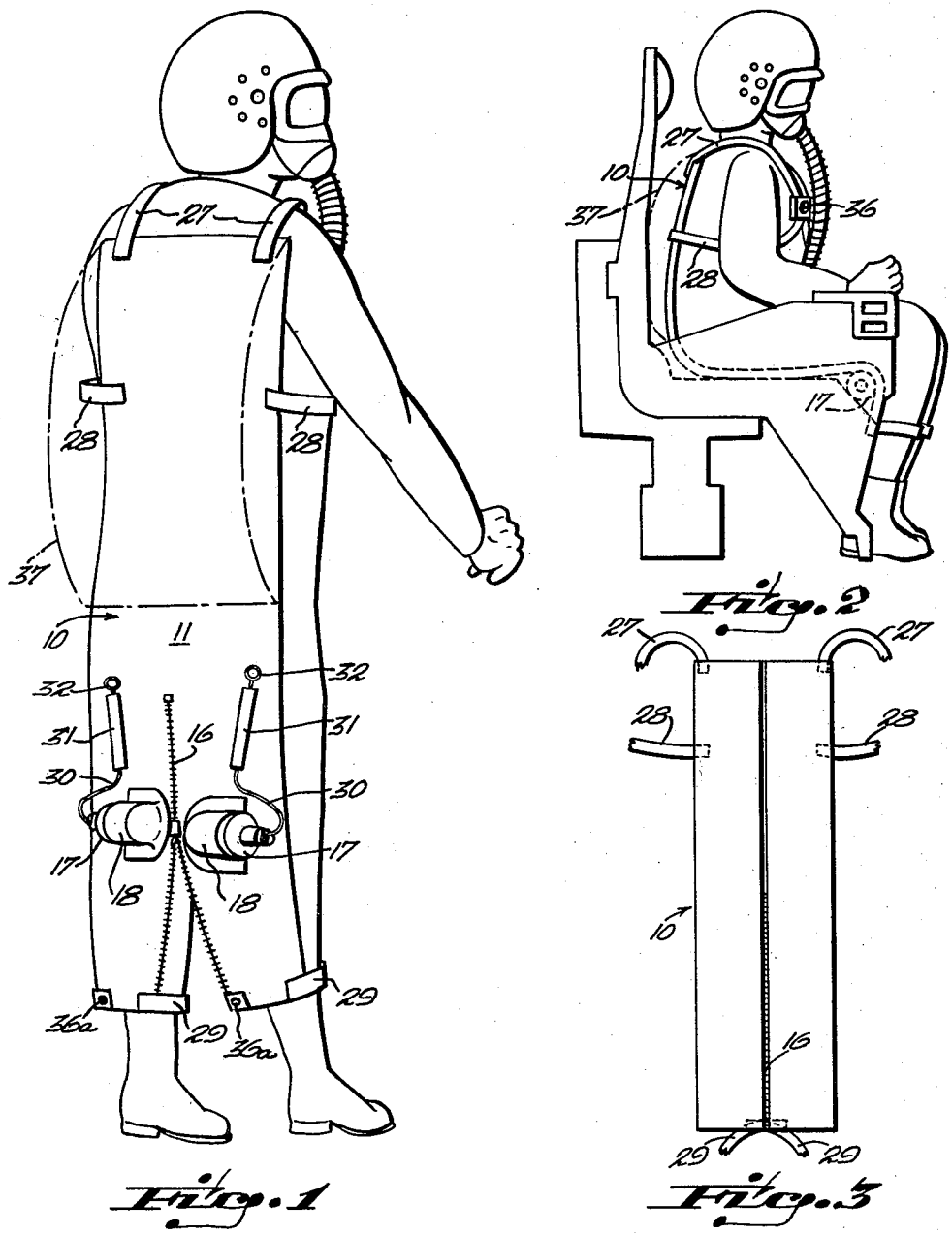

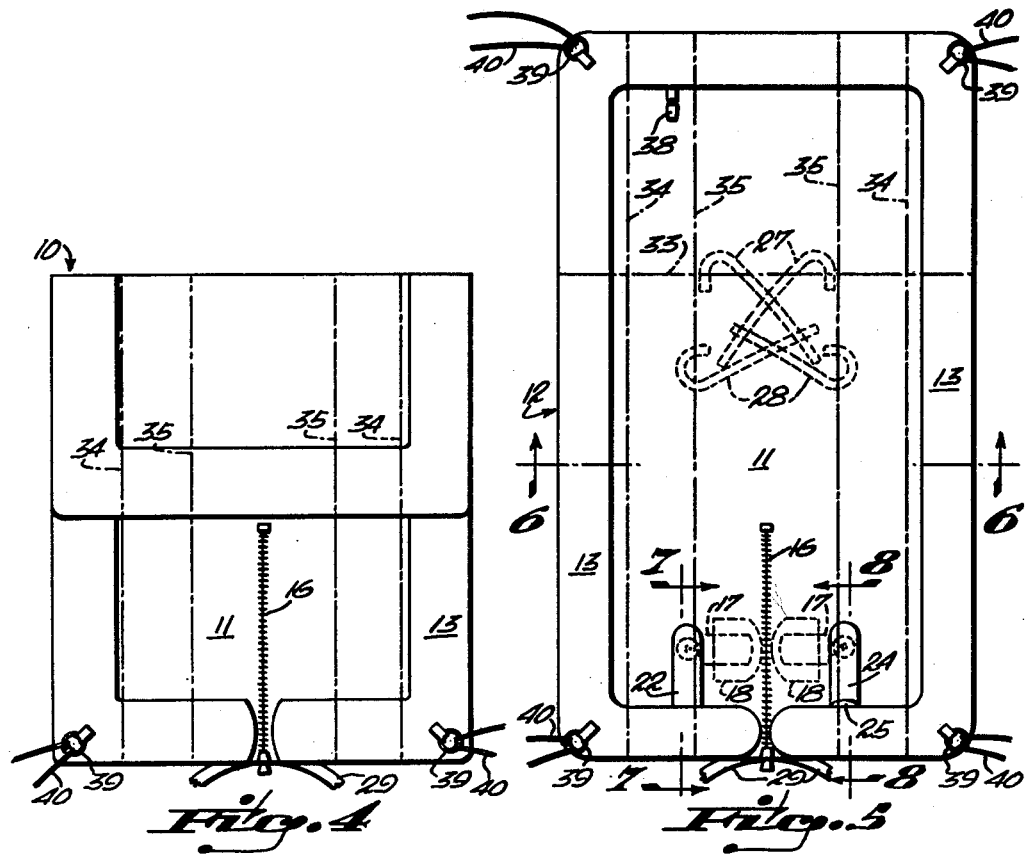
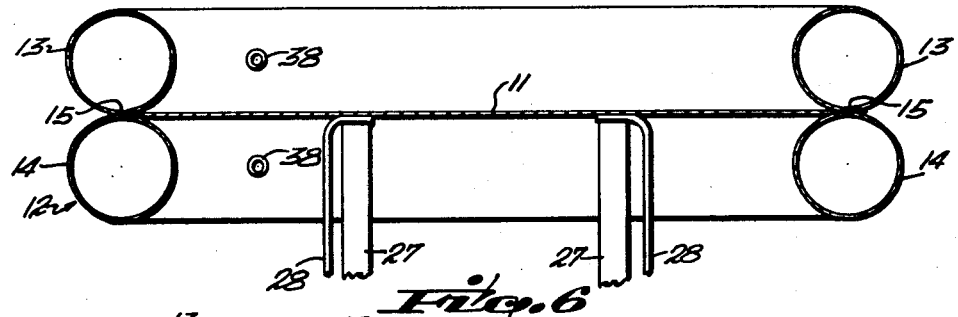
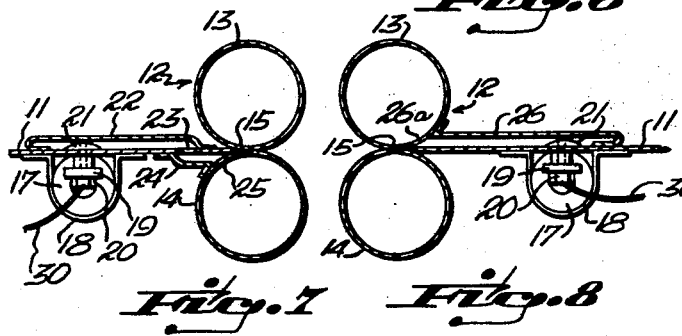

3,105,981
PERSONAL INFLATABLE LIFE RAFT
William B. Bennett, 14040 NE. 12th Ave.,
North Miami, Fla.
Filed Feb. 25, 1963, Ser. No. 261,563
7 Claims. (Cl. 9—316)

My invention relates to life rafts and is directed particularly to an inflatable life raft carried as personal equipment by an aircraft pilot and adapted to be ejected with the pilot of a disabled aircraft equipped with an ejection seat.

Presently, pilots of ejection seat aircraft are equipped with "Mae West" type inflatable life preservers in case of ejection over water. Such life preservers, surrounding the chest of the pilot, leave all but the head and shoulders submerged in the water. The resulting exposure to the water not only is hazardous because of sharks which may infest the water, but also results in physical exhaustion much sooner than if the body were supported entirely out of the water.

It is accordingly the principal object of my invention to provide a personal life raft which will be small and light enough to be conveniently and comfortably carried, and which can quickly be inflated upon dropping in the water to provide a life raft large enough to sit or lie on while awaiting rescue.

It is another object of the invention to provide a personal life raft of the character described which is also suitable for use as a life preserver for the passengers and crews of ocean liners, ships and boats, or civilian, military and private aircraft of all types, and which can even be used by astronauts as an additional safety means when landing in water.

It is still another object of the invention to provide a personal life raft of the character described which folds into an elongated pack which can readily be affixed by quick release means to the back and legs of the wearer and which includes slide fastener means bifurcating the lower end of the pack to permit free individual leg movement.

Yet another object is to provide a personal life raft of the above nature which includes automatic inflation means which can readily be actuated by a simple pulling action, and which, in case of failure of the automatic inflation means, can be inflated by mouth.

Still another object is to provide a personal life raft of the above nature which is simple in construction, easy to put on and wear, fool-proof in operation, and durable in use.

Other objects, features and advantages of the invention will be apparent from the following description when read with reference to the accompanying drawings. In the drawings, wherein like reference numbers denote corresponding parts throughout the several views:

FIG. 1 illustrates a personal inflatable life raft embodying the invention shown strapped in place against the back of a jet aircraft pilot;

FIG. 2 illustrates how the life raft conforms to the body shape of the pilot when sitting in piloting position in the ejection seat of an aircraft;

FIG. 3 is an inside elevational view, with portions of the harness broken away, of the folded inflatable life raft, shown separately;

FIG. 4 is an elevational view of the life raft, similar to FIG. 3, but shown with side portions unfolded into partial open condition;

FIG. 5 is a view similar to FIG. 4, but showing the raft fully unfolded and inflated, ready for use;

FIG. 6 is a horizontal cross-sectional view taken along the line 6—6 of FIG. 5 in the direction of the arrows;

FIG. 7 is a vertical cross-sectional view taken along the line 7—7 of FIG. 5 in the direction of the arrows; and FIG. 8 is a vertical cross-sectional view taken along the line 8—8 of FIG. 5 in the direction of the arrows.

Referring now in detail to the drawings, 10 in FIGS. 1 through 5 illustrates a personal life raft embodying the invention, the same being shown, by way of example of use, in folded condition as a pack strapped against the back of a jet pilot in FIGS. 1 and 2. As illustrated in FIG. 5, the life raft comprises a rectangular bottom panel 11 of a tough, flexible, waterproof fabric, such as rubberized nylon, about the periphery of which is sewn, cemented or otherwise securely affixed an inflatable side wall, generally designated by the number 12. The side wall 12 is also preferably fabricated of rubberized nylon, and comprises cylindrical (when inflated) upper and lower indepedent air chambers 13 and 14, respectively. The separate chambers can conveniently be provided in the side wall 12 by forming said side wall of a doubleback length of the material sewed or glued lengthwise along the middle, as indicated at 15 in FIG. 6, where it is also secured to the bottom panel 11. At one end of the bottom panel 11, as best illustrated in FIG. 5, the upper and lower side wall chamber portions terminate just short of the longitudinal center, said air chambers being sealed off thereat. For the purpose hereinafter appearing, the lower end of the bottom panel 11 is slit along the longitudinal center and fitted with a slide fastener or zipper 16, said zipper extending to about one-third the length of said panel.

Means is provided for automatically filling the air chambers 13 and 14 of the side wall 12 when the raft is to be put into service. To this end, there is secured against the underside of the bottom panel 11, in opposed relation near the zipper end of said panel and at each side of the zipper, a cylindrical compressed air container or bottle 17. The air bottles 17 are received and held in place in individual fabric pockets 18 sewn or otherwise secured against the underside of the bottom panel 11. The necks 19 of the air bottles 17 are removably attached, such as by machine bolts 20, the nipples 21 vulcanized or otherwise secured to the bottom panel 11. As illustrated in FIGS. 5 and 7, air from the left hand air bottle (as seen in FIG. 5) is conducted to the lower air chamber 14 through a flexible conduit formed of a first strip of rubberized fabric 22 extending from the top-side of the nipple 21 to a small slit 23 in the bottom panel 11, said strip being sewn or otherwise secured along its edges to the bottom panel 11, and thence through a conduit formed of a second strip of rubberized fabric 24 secured against the underside of said panel to a small slit 25 in said lower air chamber.

As illustrated in FIGS. 5 and 8, air from the right-hand bottle is conducted to the upper air chamber 13 through a flexible conduit formed of first strip of rubberized fabric 26 extending from the top-side of its respective nipple 21 and sewn or cemented along the bottom panel 11 to join a small slit 26a in the upper air chamber 13. It will thus be seen that two independent air chambers and means for automatic inflation are provided for buoyant support of the life raft. Instead of using bottles of compressed air for inflating the raft wall chambers 13 and 14 as described above, chemicals reacting with water to produce a gas could alternatively be employed.

A harness of over the shoulder and underarm straps 27, 28, respectively, are provided, said straps being secured centrally against the underside of the bottom panel 11, as hereinbelow more particularly described. Leg straps 29 are also provided, being fixed at one end to the underside of the bottom panel 11 at each side of the lower end of the zipper 16.

As illustrated in FIG. 1, the air release cords 30 of the air bottles 17 are guided upwardly through guide sleeves 31 of flexible strips of fabric sewn or otherwise affixed against the underside of the bottom panel 11, and terminate in pull rings 32 within easy reach of the pilot's hands. Since the air release mechanism actuated by pulling on the release cords is of well known construction and forms no part of the present invention, it is not deemed necessary to describe it in detail herein.

As illustrated in FIG. 4, the life raft 10 forms into a back pack by first folding the upper one-third down upon the top, along the broken line 33 shown in FIG. 5. The sides are then folded in against the top in two folds, first along the vertical fold lines 34 and then along the fold lines 35 indicated in FIG. 5, to form the elongated pack as shown in FIG. 3.

The open raft, which is preferably about 51 inches in width by 6 feet in length, is thus folded into a compact pack of about 4 feet in length and 17 inches in width, of such size as to fit comfortably against the back of the average adult.

In use, the over the shoulder and underarm harness straps will be fitted to the body, as illustrated in FIGS. 1 and 2, and joined at the front by a quick-release button-actuated fastener 36 of conventional structure. The zipper 16 will then be opened to divide the lower end of the pack and permit the desired leg movement, after which the leg straps are fitted around the legs and fastened such as by snap fasteners 36a at each side of the pack at the lower end. It is to be noted that the air bottles 17 are so placed that they extend laterally under the knees of the wearer when seated (see FIG. 2), thereby not interfering with the movements or comfort of the wearer. The pack moreover is thin enough so that a pilot can wear a back pack parachute over it without difficulty, as illustrated at 37 in FIGS. 1 and 2.

When it becomes necessary to use the raft, the pull rings 32 will be pulled upon reaching the water. Immediately thereafter, the pack release 36 will be opened and the leg straps released to separate the pack from the body, whereupon, in about a minute, the raft will be fully inflated and ready for use. It only remains to fully close the zipper 16 to prevent the entrance of water. As an additional safety feature, each of the air chambers 13, 14 is provided with a mouth inflation valve 38, as illustrated in FIGS. 5 and 6, to permit inflation by mouth in case one or both of the air bottles 17 become inoperable.

As illustrated in FIG. 5, tie rings 39 are provided at each corner of the raft to enable a plurality of the individual rafts to be tied together by short lengths of suitable strong cord 40. This is particularly advantageous to prevent separation in heavy seas or at night or in fog when a number of people are in the water, each in their individual raft.

While I have illustrated and described my personal life raft with reference to use by jet pilots, it is to be understood that it is so presented by way of example only and not in a limiting sense. The invention is as well applicable for use by anyone traveling on or above the water, and provides a measure of safety heretofore not available on a personal basis, the raft being with the person in need at the moment the necessity arises. In brief, the invention includes all the modifications and embodiments coming within the scope of the following claims.

What I claim as new and desire to secure by Letters Patent is:

1. A personal inflatable life raft comprising a substantially rectangular bottom panel of flexible waterproof material, a side wall of flexible material attached to the periphery of said bottom panel, said side wall comprising an air chamber, means for inflating said air chamber, one end of said bottom panel being bifurcated by an axial slit, slide fastener means for closing said slit, harness means secured to said panel for securing said raft to the back of a person when folded to provide a rectangular, elongated pack, and means for securing the bifurcated portions of said panel against the legs of a person.

2. A personal inflatable life raft as defined in claim 1, wherein said side wall further comprises a second air chamber, said inflating means comprising a bottle of compressed gas, a second bottle of compressed gas for inflating said second air chamber, said bottles of compressed gas being secured against said bottom panel at each side of said slit and arranged to fit behind the knees when worn as back pack.

3. A personal inflatable life raft as defined in claim 2, wherein said air chambers, when inflated, are of tubular form, one above the other and extending outwardly of each side of said bottom panel, and wherein said bottles and said harness means are secured against the same side of said panel.

4. A personal life raft as defined in claim 3, including means at each corner of the inflated raft for tying together to corners of another raft.

5. A personal life raft as defined in claim 3, wherein said inflating means further comprises flexible conduit means extending from said bottles to one each of said air chambers.

6. A personal life raft as defined in claim 1, wherein said harness means comprises shoulder and underarm straps and a quick-release mechanism for attaching said straps when the raft is worn as a back pack.

7. A personal life raft as defined in claim 3, including means for inflating said chambers by mouth in case of failure of said bottle inflating means.

References Cited in the file of this patent

UNITED STATES PATENTS

| | | |
|---|---|---|
| 2,609,549 | Krupp | Sept. 9, 1952 |
| 2,782,429 | Hennebutte | Feb. 26, 1957 |
| 2,914,779 | Walker | Dec. 1, 1959 |
| 3,015,115 | Medin | Jan. 2, 1962 |